June 27, 1944.   E. F. HUDDLE   2,352,479
WINDROWER
Filed April 20, 1942   3 Sheets-Sheet 1
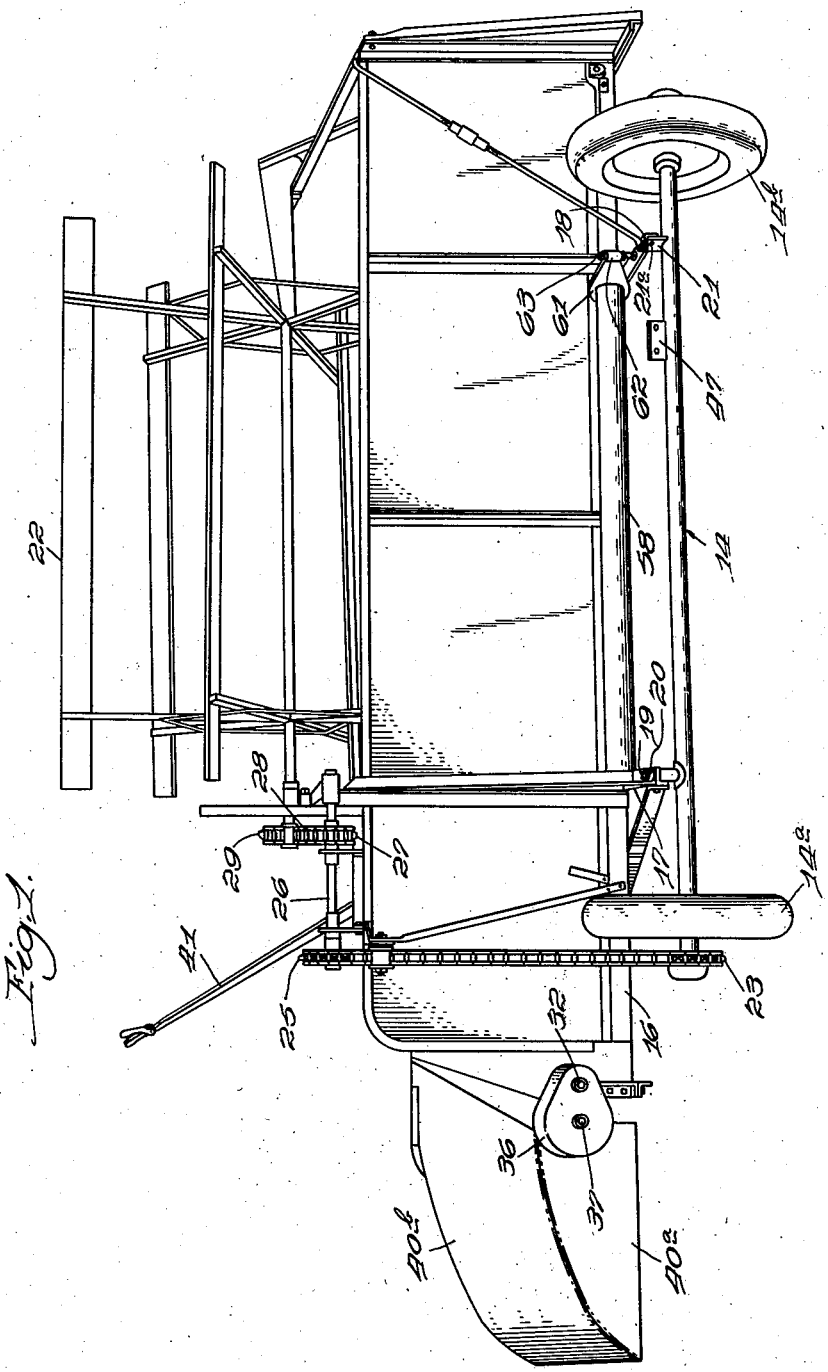

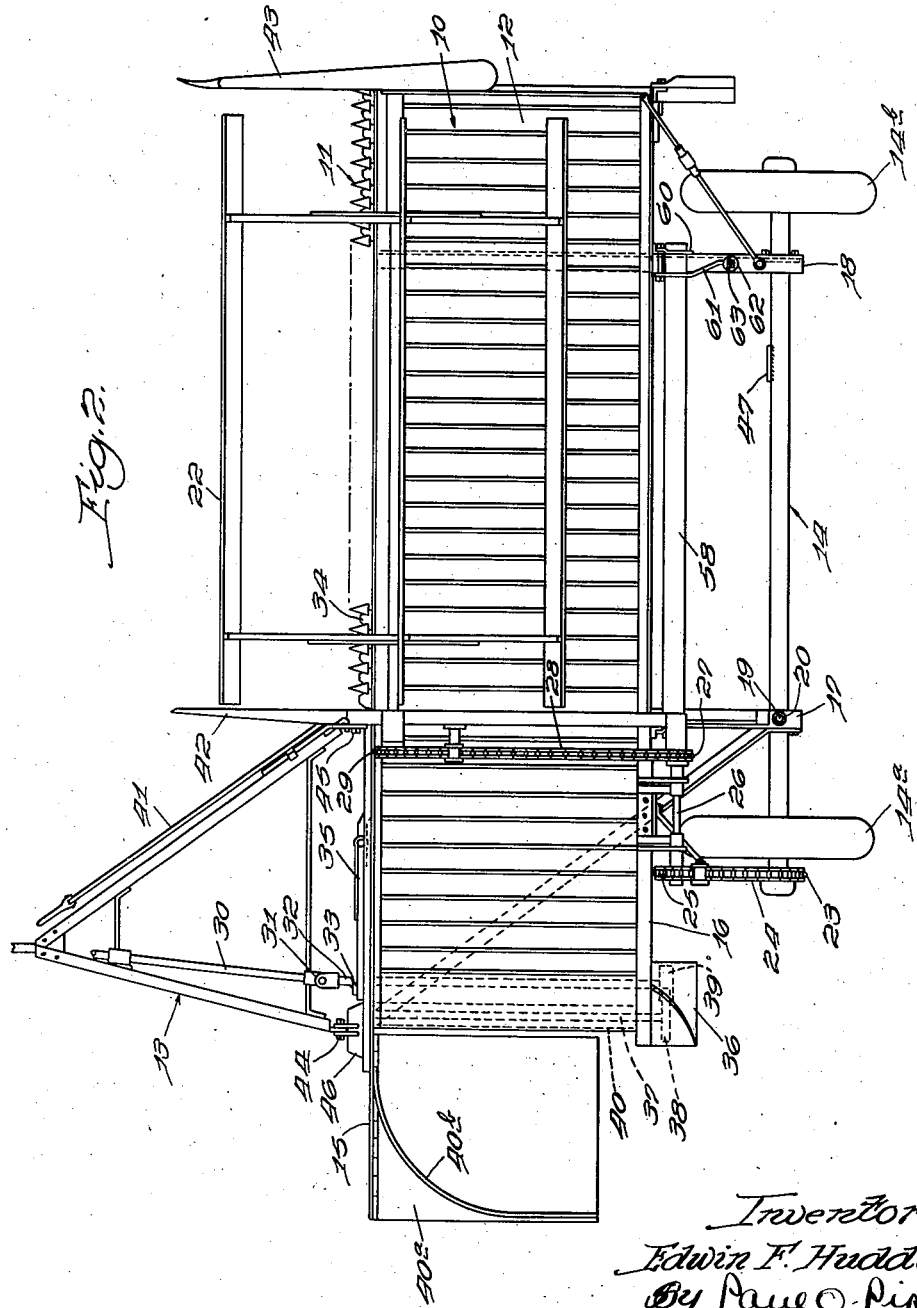

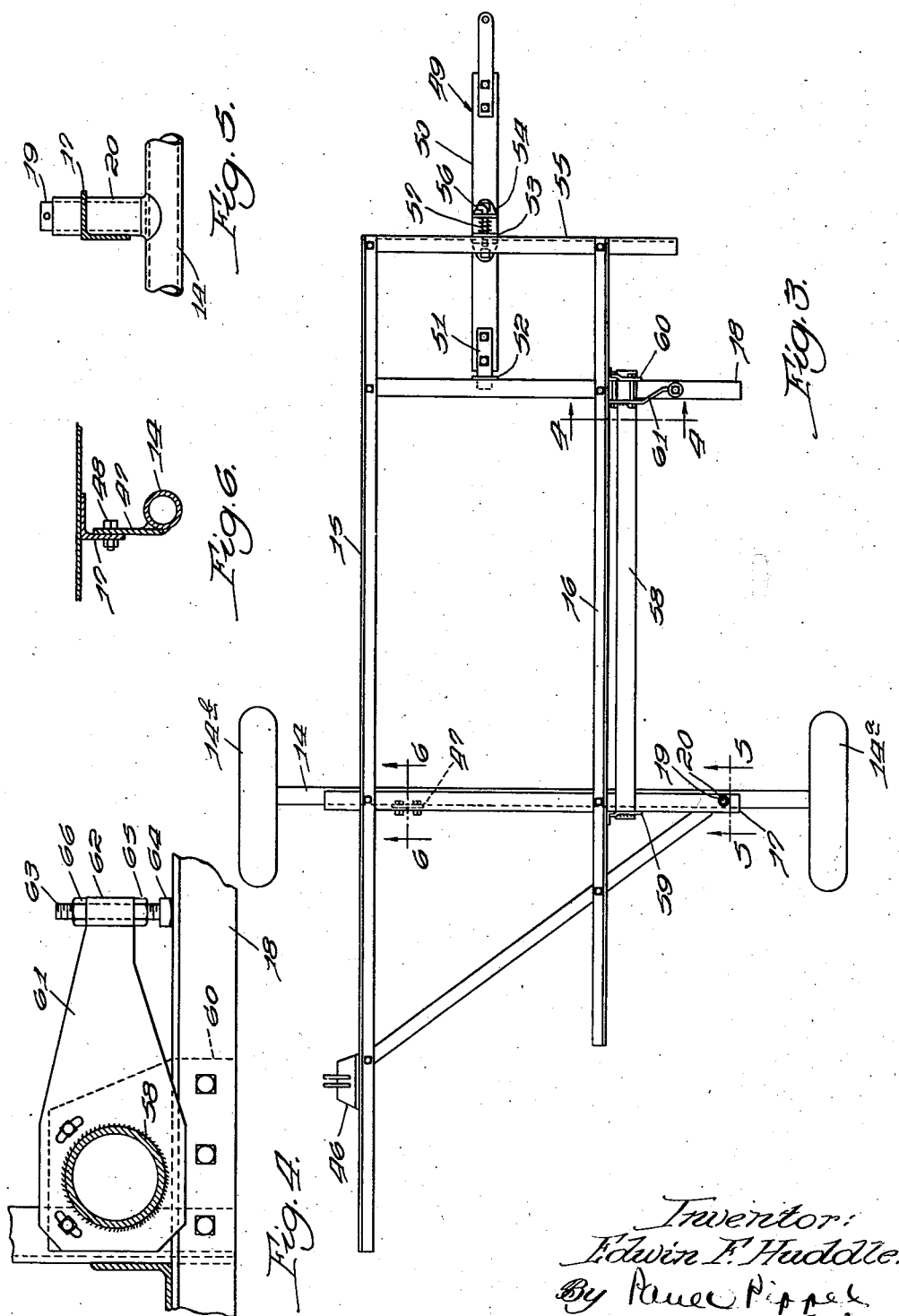

Patented June 27, 1944

2,352,479

UNITED STATES PATENT OFFICE 2,352,479

WINDROWER

Edwin F. Huddle, Elmwood Park, Ill., assignor to International Harvester Company, a corporation of New Jersey Application April 20, 1942, Serial No. 439,650

9 Claims. (Cl. 56—228)

This invention relates to harvesters. More particularly the invention relates to a novel windrow harvester construction.

It is desirable many times when harvesting grain to cut the grain and lay it into windrows so that air may circulate around the grain and dry it before it is threshed. The windrows of grain are then picked up by a mobile-type harvester thresher that threshes the grain. Since many low-cost harvester threshers are now available, it is desirable to provide a low-cost, light-weight windrower that can be used in conjunction with a mobile-type harvester thresher. Ordinarily, the platform of the windrower is of considerable length and hence very difficult to transport over narrow roads. Therefore, it is essential that a suitable transport device be provided for the windrower by which it may be readily moved from one field to another.

An important object of the present invention is to provide an improved windrow harvester.

Another important object of the present invention is to provide a novel transport device for a harvester. In this regard it is also an object of the present invention to provide a transport device which may be moved to either an operating position or a transport position with a minimum of adjustment.

These and other objects and advantages of the present invention will be apparent to those skilled in the art after a consideration of the following detailed description of the preferred structural embodiment, taken in conjunction with the accompanying drawings.

In the drawings:

Figure 1 is a rear perspective view of a windrow harvester embodying the features of the present invention;

Figure 2 is a plan view of the windrow harvester as it is assembled for operation;

Figure 3 is a plan view of the supporting framework of the windrower with the supporting axle in position for transport of the windrower;

Figure 4 is a sectional view taken along the line 4—4 of Figure 3;

Figure 5 is a sectional view taken along the line 5—5 of Figure 3; and

Figure 6 is a sectional view taken along the line 6—6 of Figure 3.

Referring now to the drawings, particularly to Figure 2, it will be seen that the windrow harvester chosen to illustrate the principles of the present invention comprises a transversely positioned platform 10 on which is mounted a cutting mechanism 11, a conveyor 12, a hitch device 13, and a supporting means in the form of an axle 14 carried on wheels 14a and 14b.

The platform 10 comprises spaced front and rear transversely positioned frame members 15 and 16, respectively, which are connected by longitudinally extending members 17 and 18. These members extend rearwardly of the rear transverse frame member 16. As shown in Figure 5, one end of the axle 14 is pivotally connected to the member 17 which extends rearwardly of the platform 10. As shown in Figure 5, this pivotal connection comprises a vertical pin 19 secured to the top side of the axle 14 and a vertically positioned sleeve 20 secured in the member 17, in which sleeve the pin 19 is positioned. A plate member 21 is secured adjacent the other end of the axle 14 and is bolted to the member 18, as indicated at 21a in Figure 1. When the windrower is in an operating position, the axle 14 is positioned as shown in Figures 1 and 2. A reel 22 mounted on the platform 10 is adapted to be driven from the supporting wheel 14a at the left end of the axle 14. This drive comprises a sprocket 23 mounted to rotate with the wheel 14a, a chain 24 meshing therewith, a sprocket 25 engaging the chain 24, a jack-shaft 26 carrying a sprocket 25, a sprocket 27 on the shaft 26, a chain 28 meshing with the sprocket 27, and a sprocket 29 engaging the chain 28 and supported by the reel 22.

The conveyor 12 is adapted to be driven from a shaft 30 which may be operably connected to the power take-off device of the tractor. The shaft 30 is mounted on the platform 10 and is connected by means of a universal joint 31 with a shaft 32. The shaft 32 is provided with a crank portion 33 which is operably connected to a knife 34 of the cutting mechanism 11 by a pitman 35. The shaft 32 extends beyond the rear of the backboard and is journaled at its rear end in a suitable gear box 36. A shaft 37 extends from the gear box 36 parallel to the shaft 32 and has a driving connection with the shaft 32 through gears 38 and 39 in the gear box 36. On the shaft 37 is secured a suitable roller 40. The conveyor which is in the form of a canvas trained about the roller 40 is driven by this roller. The conveyor 12 is also trained around an idling roller, not shown, at the other end of the platform. By virtue of this drive, the cutting mechanism 11 cuts the grain, and the conveyor 12 conveys the grain to the left side of the machine onto a stubble-bending plate 40a along which the grain is guided by a curved vertical plate 40b so as to fall from the rear end of the plate in a windrow. A clutch may be provided in the gear box 36 for starting and stopping the conveyor 12, but this is not shown, since it forms no part of the present invention.

Vertical adjustment of the platform 10 is effected by means of a lever 41 which is operably connected between the draft device 13 and the platform 10. Suitable grain dividers 42 and 43 extend forwardly from the platform 10.

The hitch device 13 is connected to the platform on a horizontal pivot by bolts 44 and 45 connected, respectively, to a bracket 46 and to the member 17.

When it is desired to transport the machine, the hitch device 13 is disconnected from the platform 10, and the axle 14 is moved into the position shown in Figure 3. To make this adjustment, the bolt 21a which connects the plate 21 with the member 18 is removed, and the axle is moved under the platform 10 to a position at right angles to the platform 10. In this position, the axle 14 is secured to the member 17, as shown in Figure 6, by a plate 47 welded to the axle 14 and a bolt 48 securing the plate 47 to the member 17. A suitable draft device 49 is connected to the right end of the platform 10, as shown in Figure 3. This device includes a main draft member 50 and a tongue piece 51 projecting from the member 50 through a slot in the member 18 and through a reenforcing piece 52 secured to the member 18. Secured to the member 50 are brackets 53 and 54 through which and through a frame member 55 forming part of the frame structure of the platform passes a retaining pin 56. A spring 57 yieldingly holds the pin 56 in position. By virtue of the mounting of the wheel-supported axle 14, only the draft device 13 and the chain 25 need be removed from the machine for transporting. The rest of the machine need not be touched. In both positions of the axle 14 with respect to the harvester framework, the axle is pivotally connected to the framework by the pin 19 secured to the axle and the sleeve 20 secured in the frame member 17, and this means constitutes a permanent tie of the axle to the framework for both positions of the axle.

Figures 3 and 4 show platform-leveling means which forms no part of the present invention and is shown more fully and claimed in applicant's Patent No. 2,320,134, issued May 25, 1943. Briefly, a torque tube 58 positioned behind the member 16 is secured at one end to the member 17 by a plate secured to the member 17 and secured to the tube 58 by welding, the tube extending through an opening in the plate 59. The other end of the tube 58 extends through an opening in a plate 60 secured to the member 18, but is not secured to the plate but merely rests therein so as to be permitted angular movement with respect thereto. A plate member 61 is secured to the tube 58 by welding at a point adjacent the plate 60 and has a tubular portion 62 through which a bolt 63 passes. The head 64 of the bolt 63 rests against the member 18, and the bolt is retained in a fixed position by nuts 65 and 66. If the right end of the platform sags, the nut 66 is loosened, and the nut 65 is tightened so that the bolt 63 is lowered and there is a downward adjustment of the right end of the member 18 as viewed in Figure 4 with a resultant upward adjustment of the left end of the member 18, which raises the right end of the platform.

By virtue of this arrangement of parts, a light-weight, low-cost windrower may be provided. The machine may be readily converted from an operating position into a transport position by virtue of the mounting of its wheel-supported axle structure.

Although only a preferred construction embodying the principles of the present invention has been shown and described, it is to be understood that the invention is not to be limited to the specific details shown and described, but that, in fact, widely different means may be employed in the practice of the broader aspects of the invention.

What is claimed is:

1. The combination with a harvester having a length considerably greater than its width and a wheel-supported axle for carrying the harvester, of means for attaching the axle to the harvester so as to cause the axle to extend in the direction of the length of the harvester for moving the harvester over the ground in a direction at right angles to its length for a harvesting operation, and of means for attaching the axle to the harvester so as to cause the axle to extend at right angles to the direction of its length for moving the harvester over the ground in the direction of its length for transport of the harvester.

2. The combination with a harvester comprising a frame of greater length than width, a cutter mounted thereon for cutting crops, a conveyor mounted on the frame immediately behind the cutter for conveying crops in the direction of the length of the frame, a wheel-supported axle, means forming a pivotal connection between the frame and the axle permanently tying the axle to the harvester both for harvesting and for transport, of means for attaching the axle to the frame so as to cause the axle to extend from the said pivotal connection in the direction of the length of the frame for movement of the harvester over the ground at right angles to the length of the frame for a harvesting operation, and of means for attaching the axle to the frame so as to cause the axle to extend from the said pivotal connection at right angles to the direction of the length of the frame for transport of the harvester over the ground in the direction of the length of the frame.

3. The combination with a harvester comprising a frame, a platform mounted thereon of greater length than width, a cutter mounted on the frame so as to extend along the front of the platform in the direction of its length, a wheel-supported axle carrying the frame, and means forming a pivotal connection between a point of the frame to the rear of the platform and a point of the axle near one end thereof permanently tying the axle to the harvester both for harvesting and for transport, of means for attaching a point adjacent the other end of the axle to a point of the frame to the rear of the platform so as to cause the axle to extend in the direction of the length of the platform for movement of the harvester for harvesting in a direction at right angles to the length of the harvester, and of means attaching a point adjacent the other end of the axle to a point on the frame at the front of the platform so as to cause the axle to extend at right angles to the length of the platform for transporting the harvester in the direction of the length of the platform.

4. The combination with a harvester having length and breadth and a wheel-supported axle for carrying the harvester, of means for attaching the axle to the harvester so as to cause the axle to extend in a certain direction with respect to the length and breadth of the harvester for movement of the harvester in a certain direction with respect to its length and breadth for harvesting, and of means for attaching the axle to the harvester so as to cause the axle to extend in another direction at a substantial angle to the said certain direction of the axle for movement of the harvester in another direction at a substantial angle to the said certain direction of movement of the harvester with respect to its length and breadth for transporting the harvester.

5. The combination with a harvester having length and breadth and a wheel-supported axle for carrying the harvester, of means for attaching the axle to the harvester so as to cause the axle to extend in a certain direction with respect to the length and breadth of the harvester for movement of the harvester in a certain direction with respect to its length and breadth for harvesting, and of means for attaching the axle to the harvester so as to cause the axle to extend at right angles to the said certain direction of the axle with respect to the length and breadth of the harvester for movement of the harvester at right angles to the said certain direction of movement of the harvester with respect to its length and breadth for transporting the harvester.

6. The combination with a harvester having length and breadth, a wheel-supported axle for carrying the harvester, and means forming a pivotal connection of the axle with the harvester permanently tying the axle to the harvester both for harvesting and for transport, of means for attaching the axle to the harvester so as to cause the axle to extend from the said pivotal connection in a certain direction with respect to the length and breadth of the harvester for movement of the harvester in a certain direction with respect to its length and breadth for a harvesting operation, and of means for attaching the axle to the harvester so as to cause the axle to extend from the said pivotal connection in another direction with respect to the length and breadth of the harvester at a substantial angle to the said certain direction of the axle for movement of the harvester in another direction at a substantial angle to the said certain direction of movement of the harvester with respect to its length and breadth for transport of the harvester.

7. The combination with a harvester having length and breadth, a wheel-supported axle for carrying the harvester, and means forming a pivotal connection of the axle with the harvester permanently tying the axle to the harvester both for harvesting and for transport, of means for attaching the axle to the harvester so as to cause the axle to extend from the said pivotal connection in a certain direction with respect to the length and breadth of the harvester for movement of the harvester in a certain direction with respect to its length and breadth for a harvesting operation, and of means for attaching the axle to the harvester so as to cause the axle to extend from the said pivotal connection at right angles to the said certain direction of the axle for movement of the harvester at right angles to the said certain direction of the harvester for transport of the harvester.

8. The combination with a harvester of greater length than width, a wheel-supported axle for carrying the harvester, and means forming a pivotal connection between the axle with the harvester permanently tying the axle to the harvester both for harvesting and for transport, of means for attaching the axle to the harvester so as to cause the axle to extend from the said pivotal connection in the direction of the length of the harvester for movement of the harvester at right angles to the direction of its length for a harvesting operation, and of means for attaching the axle to the harvester so as to cause the axle to extend from the said pivotal connection at right angles to the direction of the length of the harvester for transport of the harvester by movement in the direction of its length.

9. The combination with a harvester comprising a frame of greater length than width, a cutter mounted thereon for cutting crops, a conveyor mounted on the frame immediately behind the cutter for conveying crops in the direction of the length of the frame, a pair of frame members secured adjacent opposite ends of the frame and extending at right angles to the length of the frame to the rear thereof, a wheel-supported axle, means forming a pivotal connection between the axle and a point of one frame member to the rear of the frame permanently tying the axle to the harvester both for harvesting and for transport, of means for attaching the axle to a point of the other frame member to the rear of the frame so as to cause the axle to extend from the said pivotal connection in the direction of the length of the frame for movement of the harvester over the ground at right angles to the length of the frame for a harvesting operation, and of means for attaching the axle to the said one frame member at a point adjacent the front of the frame so as to cause the axle to extend along the said one frame member at right angles to the direction of the length of the frame over the ground in the direction of the length of the frame.

EDWIN F. HUDDLE.